F. L. STUART.
CONVEYER.
APPLICATION FILED OCT. 3, 1918.

1,312,061.

Patented Aug. 5, 1919.
4 SHEETS—SHEET 1.

Witnesses

Inventor
Francis Lee Stuart
By his Attorneys

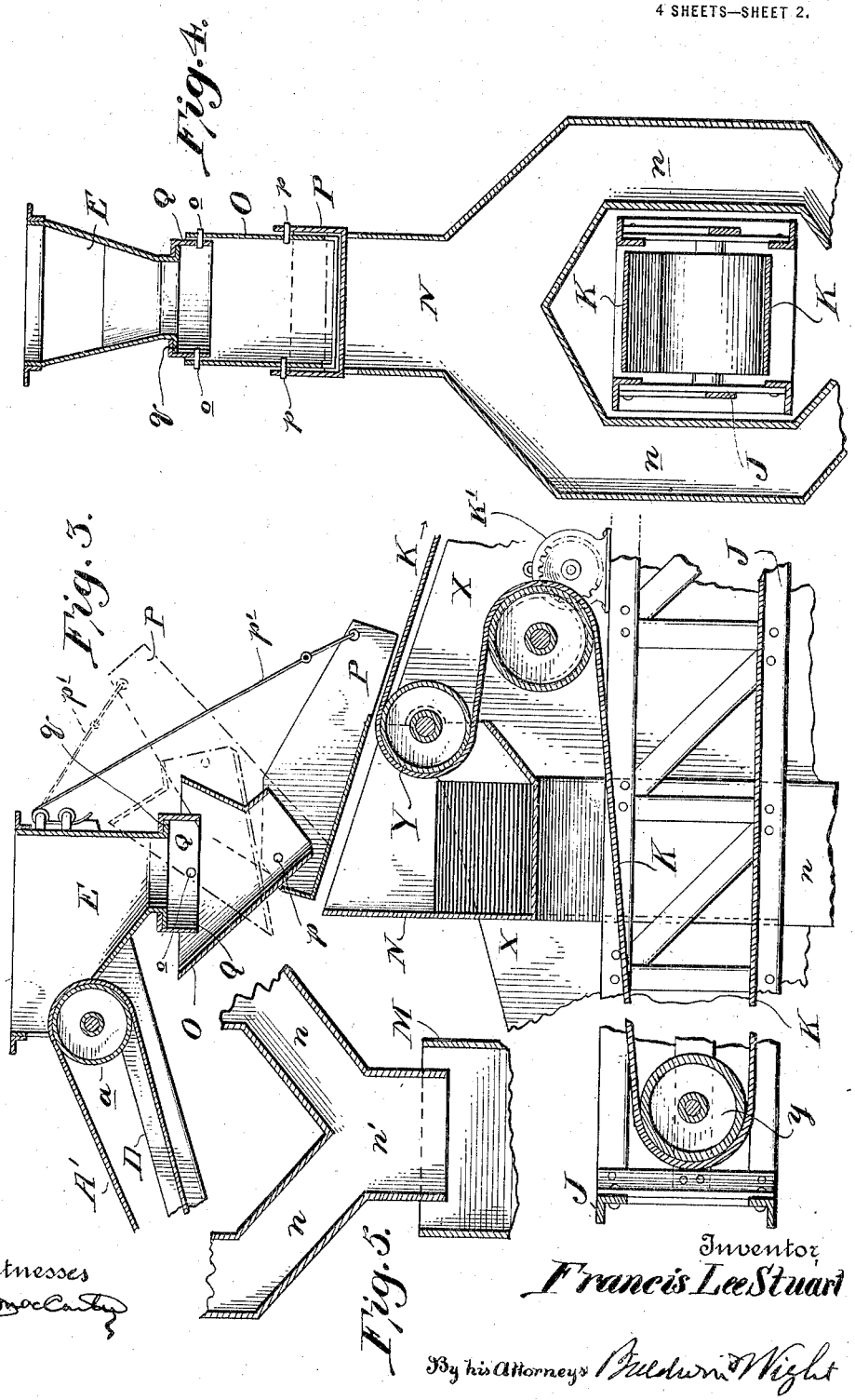

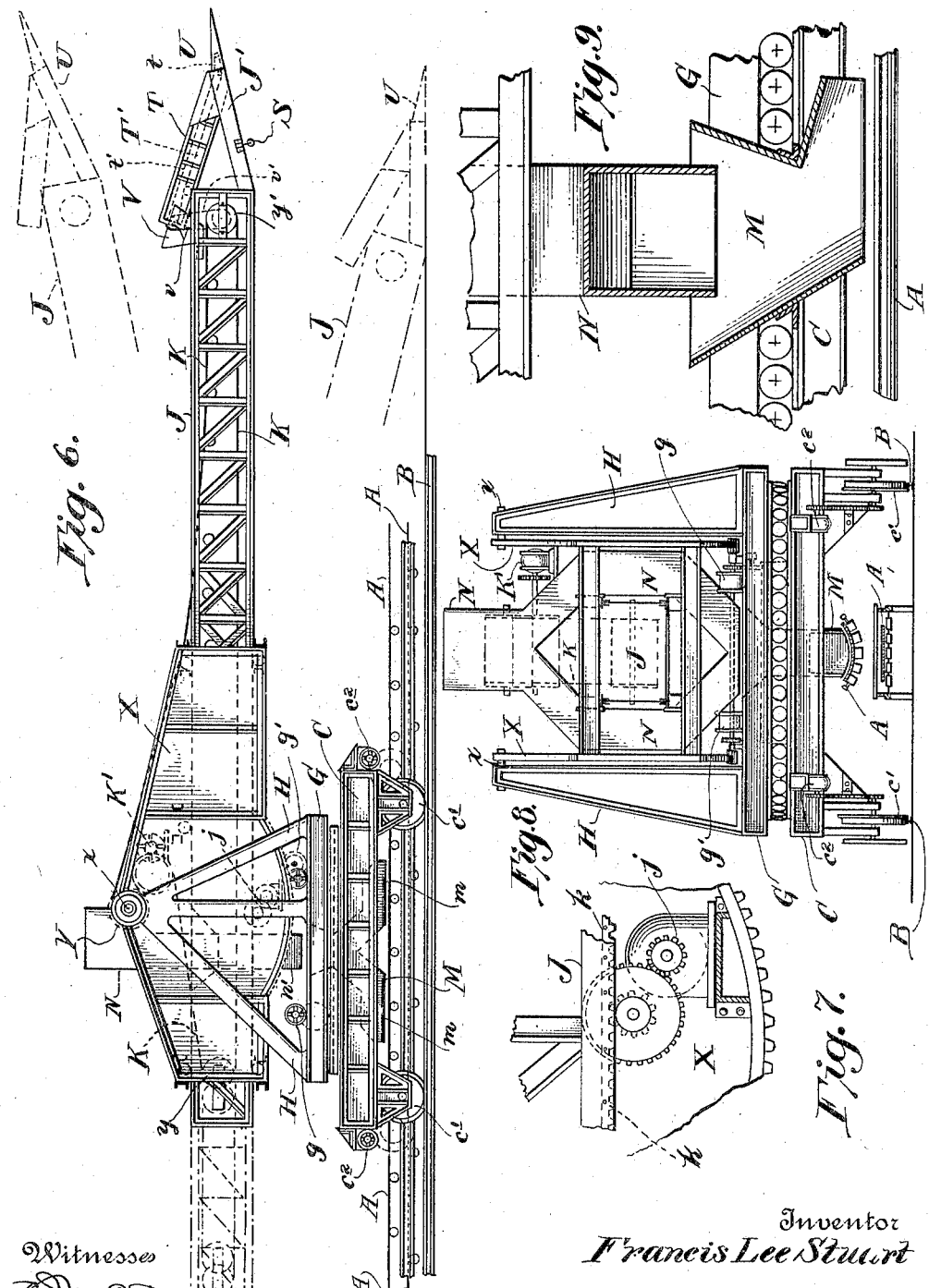

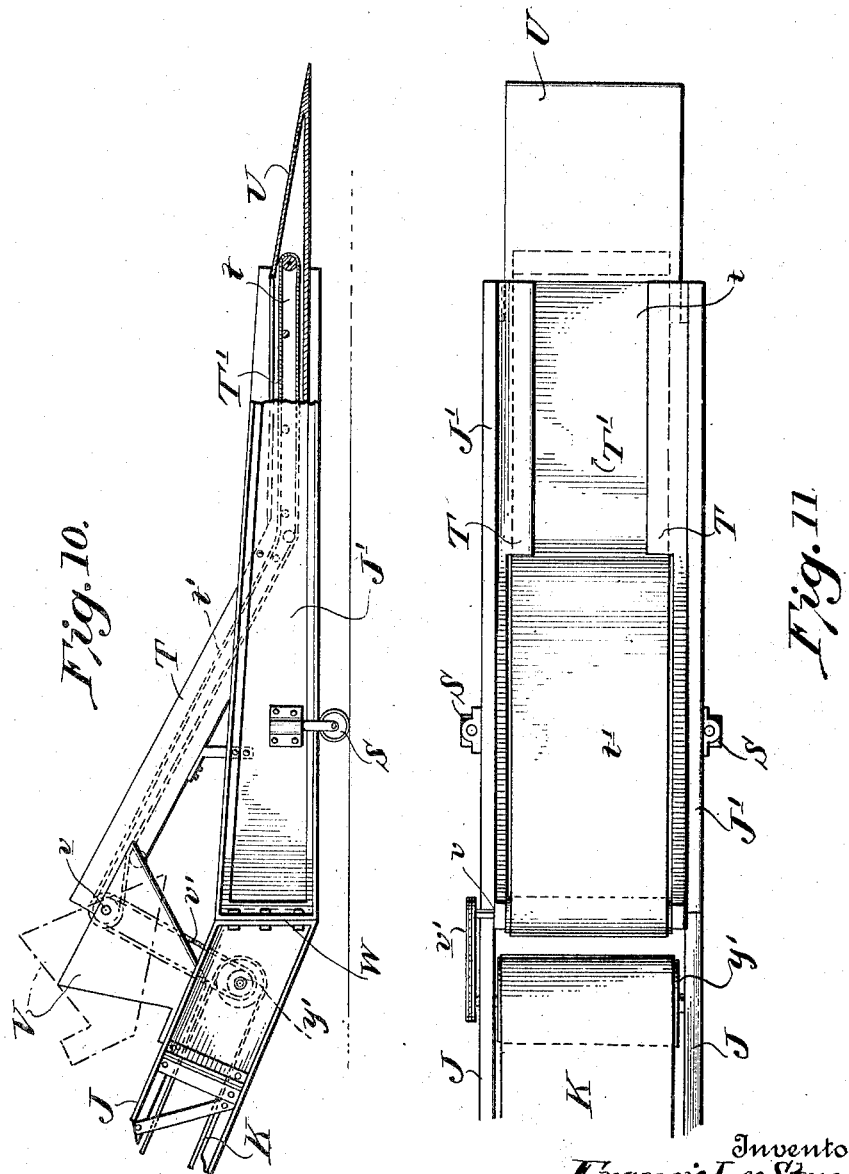

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y., A CORPORATION OF NEW YORK.

CONVEYER.

1,312,061. Specification of Letters Patent. Patented Aug. 5, 1919.

Original application filed June 3, 1918, Serial No. 237,880. Divided and this application filed October 3, 1918. Serial No. 256,678.

*To all whom it may concern:*

Be it known that I, FRANCIS LEE STUART, a citizen of the United States, residing at Washington, District of Columbia, have invented certain new and useful Improvements in Conveyers, of which the following is a specification.

This invention relates to apparatus for carrying material brought from a distance by a main conveyer belt to a pile or other place for storage and also to apparatus for gathering material and depositing it upon a conveyer which carries it to a distant point, and the principal object of the invention is to combine in a single apparatus, associated with a single belt conveyer, mechanism by means of which material may be taken from the belt and delivered by another conveyer to a storage place or may be received from carriers or from storage or a pile and deposited on the main conveyer belt, which carries it to its destination.

In my application for patent filed June 3, 1918, No. 237,880, I have shown apparatus for this purpose and have claimed broadly apparatus for receiving and delivering material, comprising a main conveyer belt, a pivotally mounted conveyer receiving material therefrom, means for moving said last mentioned conveyer in opposite directions to deliver material received from said main conveyer belt to storage or to convey material and deliver it to said main conveyer belt.

The application for the present patent is a division of said application above mentioned, and relates particularly to an apparatus in which the conveyer, which receives material from the main conveyer belt and delivers it, or gathers material and delivers it to the main conveyer belt, is made longitudinally movable or adjustable.

In carrying out my invention I provide a truck adapted to move over a track parallel with a main conveyer belt, and on this truck I mount a frame which supports a loop of the main conveyer, and which loop or tripper delivers through a hopper to a conveyer which is so mounted on a turntable supported by the truck that it may be moved both vertically and horizontally to any desired extent. Said last mentioned conveyer is supported by a frame which is adjustable longitudinally or movable longitudinally by motor mechanism so that said conveyer may be moved toward and from the material being gathered or toward and from a storage place. Said conveyer, which for convenience I call the boom conveyer, is adapted to deliver material supplied to it by the tripper to suitable carriers or a place for storage. The boom conveyer is provided with a plow, scraper, or other suitable device for gathering material and the belt conveyer of the boom is motor driven. At its inner end the boom conveyer delivers through a hopper to a chute carried by the truck, which in turn transfers the gathered material to the main conveyer belt.

Motor mechanism is provided whereby the truck carrying the tripper may be moved from place to place to any desired extent, and other motor mechanism is employed for turning the boom conveyer about both vertical and horizontal axes and for moving the boom conveyer longitudinally in its supporting frame.

Other features of the invention will be hereinafter described.

In the accompanying drawings:—

Fig. 3 is a view on an enlarged scale and in section, illustrating particularly the mechanism by means of which material may be delivered from the main conveyer to the boom conveyer or from the boom conveyer to the main conveyer.

Fig. 4 is a sectional view of the same taken at right angles to that shown in Fig. 3.

Fig. 5 is a detail sectional view showing how the lower portion of one of the hoppers delivers to a chute through which the material passes to the main conveyer belt.

Fig. 6 shows a side elevation of another form of the apparatus.

Fig. 7 is a detail view of the motor mechanism for moving the boom conveyer horizontally in its frame.

Fig. 8 is an end view of the left hand end of the apparatus.

Fig. 9 is a detail sectional view showing how the hopper (Fig. 1), which receives material from the boom conveyer, delivers through a chute to the main conveyer belt.

Fig. 10 is a detail view partly in side elevation and partly in section of the plow or gathering mechanism and illustrates how material is conveyed from the plow to the boom conveyer.

Fig. 11 is a plan view thereof.

The main conveyer belt A runs parallel with the rails B of a track on which a truck C is supported. The truck C is connected with another truck or frame D on which is supported a loop A' of the main conveyer belt, which loop at its upper end passes around a roller a and at that point delivers to a hopper E. The frame D is coupled to the truck C at c and may be moved from place to place therewith. The two parts C and D may be considered a single truck. The truck C has wheels c' resting on the rails B and these he are motor driven as indicated at c². The truck supports a turntable G, which in turn supports a frame H to which is pivotally connected a boom conveyer frame J in such manner that the boom conveyer may be turned about a horizontal axis. The frame H supports a cradle or frame consisting of two side members X which are pivotally connected with the frame H at x and the boom conveyer frame J is supported in the members X and is adjustable longitudinally therein. Suitable motor mechanism g is employed for turning the turntable about a vertical axis and other motor mechanism g' is employed for turning members X about their pivots x. In this way the boom conveyor may be adjusted about a vertical and a horizontal axis to the desired extent. The boom conveyor frame J is moved longitudinally in the frame X by means of a motor j which is connected by a gearing as indicated with a rack h on the under side of the frame J of the boom conveyer (Fig. 7). In this way the boom conveyer may be extended from the truck to any desired extent or it may be reciprocated in its supporting frame toward and from the material being gathered or deposited without moving the truck. The boom carries a belt K which is motor driven as indicated at K'.

The truck C is provided with a chute M which delivers to the main conveyer belt A. This chute extends centrally through the truck and the turntable G and receives material from a hopper N which is supported by the members X. As indicated in Figs. 4 and 5 the hopper N is bifurcated, the legs n of the bifurcated hopper extending around the boom conveyer and meeting again as indicated at n' in Fig. 5, just over the chute M.

Figure 1:
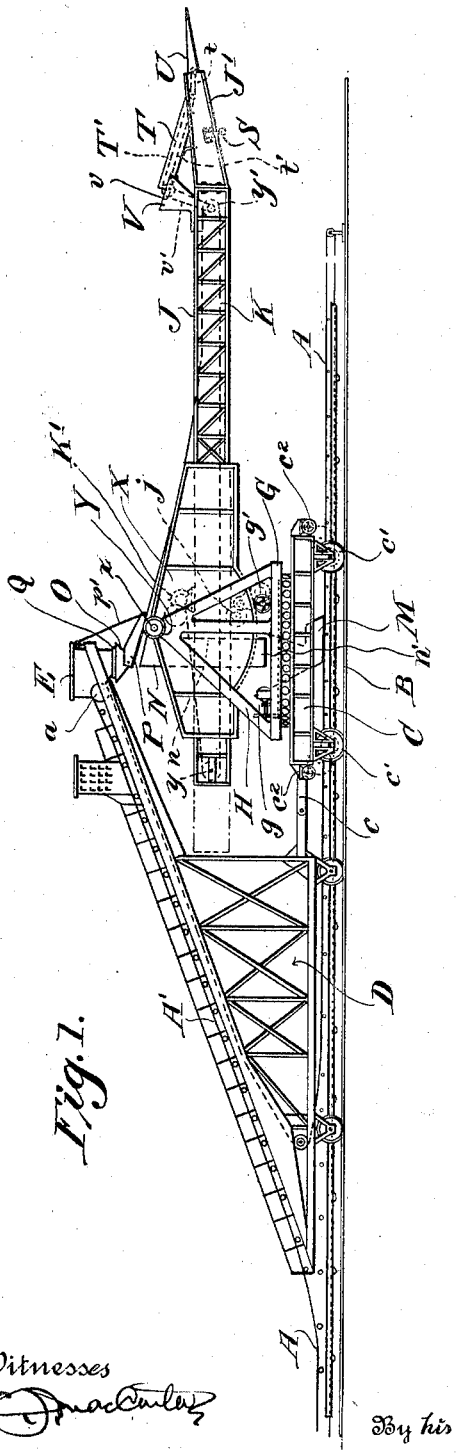
Figure 1 shows a side elevation of apparatus embodying my invention.
Figure 2:
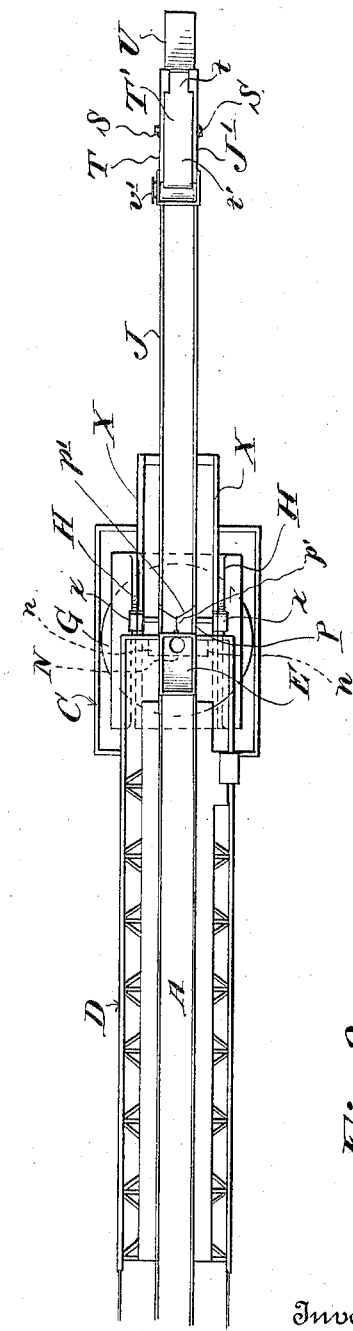
Fig. 2 is a plan view thereof.

The loop A' of the main conveyer belt delivers to the hopper E which is supported by the frame D and this hopper E supports another hopper O which delivers to the belt K of the boom conveyer. P indicates a chute interposed between the hopper O and the belt K which guides material from the conveyer to the belt. This chute is pivotally connected to the hopper at p and may be raised and lowered by devices p' in the manner indicated by dotted lines in Fig. 3. The hopper O is pivotally connected at o to a ring Q which is pivotally supported at q by the hopper E, the arrangement being such that while the hopper E remains stationary the hopper O and the chute P may be turned about a vertical axis so that they may follow the horizontal movements of the boom conveyer and the pivotal connection between the hopper O and the ring Q is such that the hopper O may be turned about a horizontal axis in order that the hopper O and chute P may be moved to follow the vertical movements of the boom conveyer. When all the parts are in the position shown by full lines in Fig. 3, material may be delivered from the hoppers E and O and the chute P to the belt K. When the belt is moved in the direction indicated by the arrow in Fig. 3, said belt may deliver the material which it receives to a place of storage or to carriers, but when the belt K is moved in the opposite direction and is reclaiming material or carrying material to the main conveyer belt, the hopper O and chute P are raised to the position shown by dotted lines in Fig. 3, so that the belt K may deliver material through the hopper M and chute N to the main conveyer belt. The boom conveyer belt is driven by the motor mechanism indicated at K' in Figs. 1 and 6.

The belt K is supported at opposite ends by rollers y, y' and it is provided with a loop or tripper Y whereby when the boom conveyer is reclaiming material it may deliver to the hopper N.

At its outer end the boom conveyer frame is provided with means for gathering material from a pile or for receiving it from any source of supply. The gathering mechanism shown comprises a plow which may be thrust endwise into a pile of material. The outer end of the conveyer frame has a section J' inclined relatively to its inner part and it is supported by swivel wheels S on the part J' of the frame which is detachable from the main part J. Frame pieces T detachably connected with the frame J' support an auxiliary belt conveyer T', having a horizontal part t and an inclined part t'. The plow U, which is thrust into the pile of material, delivers to the belt T' and this belt delivers to the hopper V which is hinged to the frame pieces T at y. When the belt K is delivering from the main conveyer, the hopper V should be raised in the manner indicated by dotted lines in Fig. 10 and when so raised, material from the belt K may be freely delivered, but when material is being conveyed from storage or from carriers to the main conveyer belt, the hopper V should occupy the position shown by full lines in Fig. 10. The belt T' may be driven from the conveyer K in the manner indicated at v' in Fig. 10.

When operating to store material, the truck C and frame D may be moved to any desired extent while still maintaining operative relation with the main conveyer belt and material may be delivered at any desired place from the main conveyer by means of the boom conveyer.

When operating to reclaim material, the boom may be set at the proper angle and thrust into a pile in such manner as to gather material therefrom. The truck C and parts connected therewith may be moved back and forth while performing this operation, the angle of the boom conveyer being suitably changed to correspond with the change in the slope or size of the pile. While thus operated the material is delivered, in the manner before described, to the main conveyer and is carried to its destination.

The construction of the apparatus is also such that the boom conveyer may be extended or adjusted longitudinally so that the delivery or receiving end of the boom conveyer may be set at any desired distance from the truck. Furthermore, the construction is such that without moving the truck the boom conveyer when carrying a plow may be reciprocated so as to be readily thrust into a pile to gather material therefrom.

In Fig. 6 I have shown some of my improvements embodied in a modified form of the apparatus. The construction is similar in most respects to that hereinbefore described, but in this case the truck or frame D is omitted and no provision is made for receiving material from the main conveyer belt and conveying it to storage, no tripper being provided in the main conveyer belt. Such apparatus is especially intended for gathering material and supplying it to the main conveyer belt which carries the reclaimed material to any desired point. In this arrangement the conveyer belt may be moved in either direction, the chute M having two outlets m so as to properly deliver the material to the belt in whichever direction it may be moved. The parts similar to those shown in Figs. 1 to 5 are similarly lettered.

The plow and the parts immediately associated therewith are carried by a frame which may be detachably connected, as indicated at W, with the frame of the boom conveyer, so that when desired the plow and the auxiliary conveyer T' may be taken away and this is often desirable when the apparatus is used to store material. When this is again needed for gathering material the plow and associated parts may be again applied to the outer end of the boom conveyer.

The boom conveyer may be made to operate on either side of the main conveyer belt. It may be moved forward to collect material from a pile, then moved backward set at another angle, and then moved forward again. In this way the slope of the pile is gradually reduced and the material is delivered to the main conveyer belt which carries it to its destination.

I claim as my invention:

1. Apparatus for receiving and delivering material, comprising a main conveyer belt, a pivotally mounted conveyer receiving material therefrom, means for moving said last mentioned conveyer in opposite directions to deliver material received from said main conveyer belt to storage or to convey material and deliver it to said main conveyer belt, and means for adjusting said pivotally mounted conveyer longitudinally or endwise.

2. Apparatus for receiving and delivering material, comprising a main conveyer belt, a pivotally mounted boom conveyer to which the main conveyer belt delivers, means for conveying material received by the boom conveyer to the main conveyer belt, and means for adjusting or moving said boom conveyer longitudinally or endwise.

3. Apparatus for reclaiming and conveying material, comprising a main conveyer belt, a truck mounted to move parallel therewith, a boom conveyer mounted on the truck, means for conveying material from the main conveyer belt to said boom conveyer, means for conveying material from the boom conveyer to the main conveyer belt, and means for moving said boom conveyer longitudinally or endwise across the truck.

4. Apparatus for reclaiming and conveying material, comprising a main conveyer belt provided with a tripper, a pivotally mounted boom conveyer to which said tripper delivers, means for driving said boom conveyer in opposite directions to convey material, means for conveying material from the boom conveyer to the main conveyer belt, and means for adjusting or moving said boom conveyer longitudinally with reference to its pivotal connection.

5. Apparatus for reclaiming and conveying material, comprising a main conveyer belt, a truck mounted on to move parallel therewith, a boom conveyer mounted on the truck, means for conveying material from the main conveyer belt to said boom conveyer, means carried by the boom conveyer for gathering material, means for conveying material from the boom conveyer to the main conveyer belt, and means for moving the boom conveyer endwise across the truck.

6. Apparatus for reclaiming and conveying material, comprising a main conveyer belt, a truck mounted to move parallel therewith, a turntable mounted on the truck, a cradle supported by the turntable and adapted to move about a horizontal axis, a boom conveyer longitudinally adjustable in said cradle, means for gathering material on the outer end of said boom conveyer, means for delivering material from the boom conveyer to the main conveyer belt, and means for delivering material from the main conveyer belt to said boom conveyer.

7. Apparatus for reclaiming material, comprising a main conveyer belt, a truck mounted to move parallel therewith, a turntable carried by said truck, a frame carried by said turntable, a cradle pivotally connected with said frame to move about a horizontal axis, a boom conveyer movable longitudinally in said cradle, a digger on the outer end of said boom for gathering material and depositing it on said boom conveyer, and means for driving the truck, turning the turntable, swinging said cradle, and moving longitudinally said boom conveyer.

8. Apparatus for reclaiming and conveying material, comprising a main conveyer belt, a truck mounted to move parallel therewith, a turntable on said truck mounted to turn about a vertical axis, a cradle supported on the truck and adapted to move about a horizontal axis, a boom conveyer movable longitudinally in said cradle, a plow on the outer end of said boom, motor mechanism for reciprocating the boom conveyer in the cradle, and motor mechanism for driving the truck, operating the turntable, and swinging the cradle.

In testimony whereof, I have hereunto subscribed my name.

FRANCIS LEE STUART.